UNITED STATES PATENT OFFICE.

ARNOLD VOSWINKEL AND RICHARD LAUCH, OF BERLIN, GERMANY.

BROMIN-SUBSTITUTED TANNIN-UREA DERIVATIVE AND PROCESS OF MAKING SAME.

No. 828,908.      Specification of Letters Patent.      Patented Aug. 21, 1906.

Application filed March 28, 1905. Serial No. 252,540.

*To all whom it may concern:*

Be it known that we, ARNOLD VOSWINKEL, apothecary and doctor of philosophy, residing at 154 Kurfürstenstrasse, and RICHARD LAUCH, chemist and doctor of philosophy, residing at 20 Karlsbad, in the city of Berlin, Kingdom of Prussia, and German Empire, subjects of the German Emperor, have invented a certain new and useful Bromin-Substituted Tannin-Urea Derivative and Process of Making the Same, of which the following is a specification.

This invention refers to a process for manufacturing a new kind of condensation products from bromin-substituted tannin-like substances by means of urea, the said condensation products being of great value in pharmacy and in the arts. The process is based upon the fact that the action of formaldehyde upon a mixture of bromin-substituted tannin and urea is quite different from the action of formaldehyde upon each of the said ingredients taken separately. While the action of formaldehyde upon urea produces an anhydro compound and the action of formaldehyde upon bromin-substituted tannin, on the other hand, will yield a substituted methylene-di-tannin, the action of formaldehyde upon a mixture of bromin-substituted tannin and urea will fail to produce a mixture of the two reaction products, but another product the properties of which are quite different from those of the reaction products above referred to. The new products are obtained by reacting upon molecular quantities of bromin-substituted tannin and urea with formaldehyde, whereby a bromin - substituted tannin-methylene-urea compound results. This reaction is similar to that already described in the application of United States patent, Serial No. 230,793, filed by one of us on October 31, 1904, where it has been shown that the mutual reaction of tannin with formaldehyde and urea will yield tannin-methylene urea, which was quite a novel reaction, in view of the fact that urea does not yield any methylene compound, (compare also *Berichte der Deutschen Chemischen Gesellschaft*, XXIX, 2436 and 2751.) That the product of reaction in the present case is also pure bromin-substituted tannin - methylene urea is conclusively proved by the fact that the said condensation products dissolve readily in alkalies, while the reaction products obtained by reacting with formaldehyde upon urea are known to be completely insoluble in alkalies. The bromin compounds thus obtained in view of the bromin contained therein differ materially as regards their therapeutic efficiency from the products not substituted by bromin and described in United States application for patent Serial No. 230,793, of October 31, 1904.

The manufacture of the said compounds is, for instance, effected as follows: Thirty-two parts of tannin are dissolved in sixty parts absolute alcohol, and then sixteen parts of bromin are added, while the solution is kept cool and agitated. After allowing to stand for twelve hours about eighty parts of concentrated hydrochloric acid are cautiously added in such a manner that the bromin compound that might possibly separate out is dissolved again by agitating the solution. Then six parts of urea dissolved in seventy parts of water are added. If the mixture should not be perfectly clear, some alcohol is added. After having added thirty - two parts of formaldehyde of forty-per-cent. strength at 10° a turbidity will appear very soon and the product of condensation begins to separate out as a flocculent amorphous mass. This separation is finished after twenty-four hours. The precipitate is filtered off and is washed very well with water. By then drying at a low temperature a light yellowish dry powder is obtained. If dried at a higher temperture, it is of a deep yellow color. It contains about fifteen per cent. of bromin. It dissolves at from 50° to 60° centigrade in alkali-carbonates and sodium borate, while acids precipitate it again from its solutions. It does not melt at 240° centigrade. It dissolves easily in concentrated sulfuric acid, while it is insoluble in organic solvents. Alcohol dissolves small quantities at a higher temperature. When larger quantities are dissolved upon heating, the preparation consists of methylene tannin-urea not substituted by bromin or of the di-bromin compound, both of which are readily soluble in alcohol, for if in the above example thirty-two parts of bromin are employed instead of sixteen parts a di-bromin compound results which is soluble in absolute alcohol and which may be separated from the solution by means of water. It contains from 5.35 to 5.5 per cent. of nitrogen, found by analysis, while the calculated percentage would be 5.08 per cent. Its percentage of bromin has been found to amount to twenty-five per cent., while the formula would call for 28.9 per cent. The said product is soluble in alkalies and melts at 210° centigrade and becomes decomposed. Hence according to the quantity of the bromin employed mixtures of the not-bromin-substituted compound with mono-bromin compounds and di-bromin compounds can be obtained in the treatment of tannin with a smaller or larger quantity of bromin. Other bromin-substituted tannin-like agents can be obtained in the same manner. These bromin compounds, and in particular the mono-bromin compounds, are very valuable in therapeutics on account of their containing bromin. Owing to the presence of this element they will act as bactericides. Besides, they act as desiccating agents, and they will also reduce secretions, and their application will stop itching. In view of their very superior physical properties, and since they present a light loose perfectly amorphous powder, they can be used with advantage in form of powder so as to be applied by being strewn on the parts to be treated and they may be diluted, if desired, with starch, oxid of zinc, or they may be employed in form of paste or by dissolving them in borax.

What we claim, and desire to secure by Letters Patent of the United States, is—

1. The process of preparing methylene compounds of bromin-substituted tannin and urea, which consists in preparing solutions of molecular weights of bromin-substituted tannin and reacting upon said solutions with urea and then with formaldehyde.

2. The process of preparing methylene compounds of bromin-substituted tannin and urea, which consists in treating bromin-substituted tannin-containing substances with urea and with formaldehyde.

3. The process of preparing methylene compounds of bromin-substituted tannic acid and urea, which consists in treating tannic acid with bromin, dissolving said bromin compound obtained in alcoholic solvent and treating said compound with the molecular quantity of urea and with formaldehyde, and separating the resulting precipitate from the remaining solution.

4. As new articles of manufacture the solid condensation products of bromin-substituted tannin with urea and formaldehyde, the said products being soluble in alkaline liquids and containing about fourteen to twenty-nine per cent. of bromin.

5. As a new article of manufacture, the condensation product of mono-bromin-substituted tannin with urea and formaldehyde, the said condensation product being a yellow powder, soluble in alkali-carbonates, and in sodium borate, and being capable of precipitation by treatment of its solution with acids and being only slightly soluble in alcohol at an elevated temperature, and not melting at 240° centigrade.

In testimony whereof we have signed our names to this specification in the presence of two subscribing witnesses.

ARNOLD VOSWINKEL.
RICHARD LAUCH.

Witnesses:
HENRY HASPER,
WOLDEMAR HAUPT.